W. J. ANTHONY

April 26, 1932. AUTOMATIC SAFETY STOP MECHANISM Re. 18,443

Original Filed May 13, 1930 2 Sheets-Sheet 1

WITNESSES

Geo. M. Taylor

Chris Feinle.

INVENTOR

Willis J. Anthony

BY

Munn & Co.

ATTORNEYS

W. J. ANTHONY

April 26, 1932. AUTOMATIC SAFETY STOP MECHANISM Re. 18,443

Original Filed May 13, 1930 2 Sheets-Sheet 2

WITNESSES
Geo. W. Naylor
Chris Feinle.

INVENTOR
Willis J. Anthony
BY
Munn & Co
ATTORNEYS

Reissued Apr. 26, 1932

Re. 18,443

UNITED STATES PATENT OFFICE

WILLIS J. ANTHONY, OF ESCANABA, MICHIGAN

AUTOMATIC SAFETY STOP MECHANISM

Original No. 1,829,626, dated October 27, 1931, Serial No. 452,016, filed May 13, 1930. Application for reissue filed February 20, 1932. Serial No. 594,346.

This invention relates to improvements in lathes used to manufacture veneer from logs of various sizes as to length and diameter, by chucking them at the ends and turning them against a knife which is attached to a carriage forming a part of the lathe.

More particularly the invention relates to means which automatically stops the knife carriage in relation to the chucks which hold the log, to thus prevent the knife from being damaged by coming in contact with the chucks, in consequence of the log being reduced in diameter to that of the chucks.

The invention has for its general object the provision of an improved and efficient means for a lathe of the indicated character, whereby to automatically prevent the material removing cutter or knife of the lathe from being damaged in the operation of the lathe, and requiring no attention in this respect on the part of the operator.

Another object of the invention is the provision in a lathe of the indicated character of means adapted to be regulated to operate at different times to stop the knife carriage thereof in any one of several positions according to the size of chucks used for the stated purpose.

With the foregoing and other objects in view the invention resides in the combinations, construction and operation of the parts hereinafter fully described and illustrated in the accompanying drawings, in which.

Figure 1:
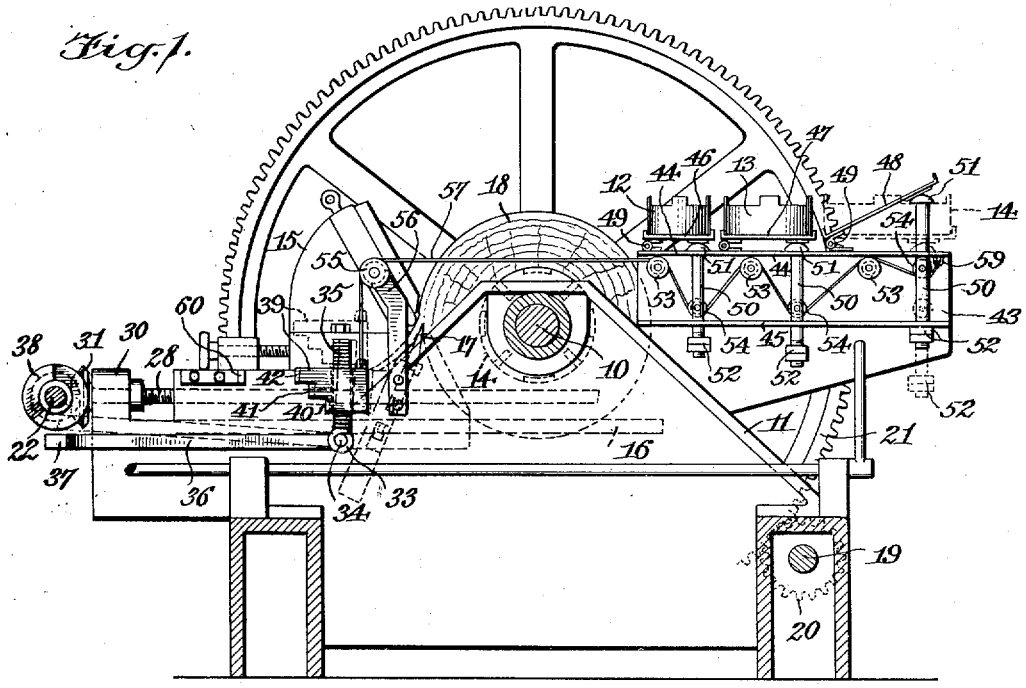
Figure 1 is a section of a rotary veneer lathe selected to illustrate the invention applied thereto, the section being taken on the line 1—1 of Fig. 2.
Figure 2:
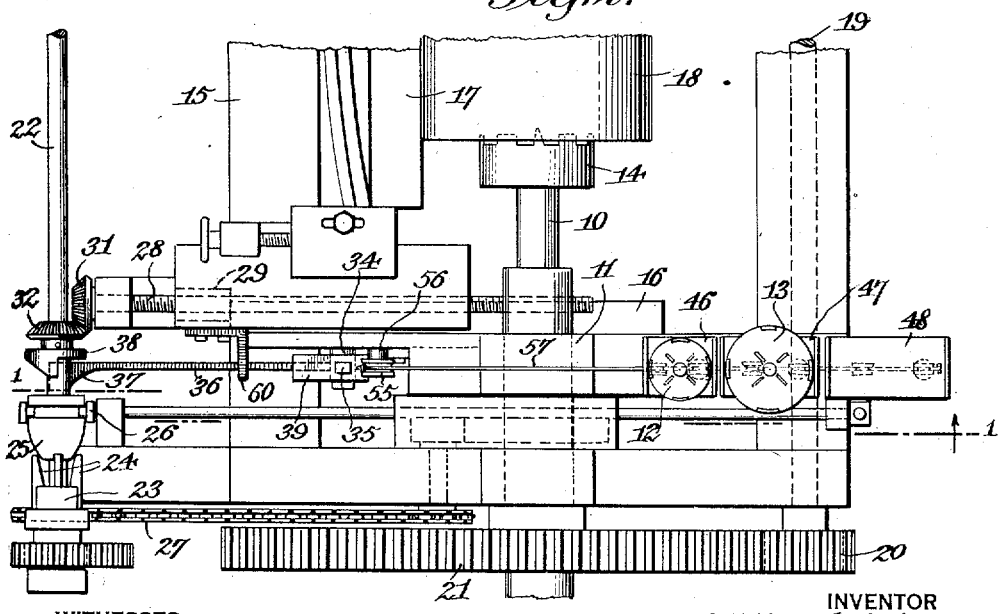
Figure 2 is a plan of one end of the lathe.
Figure 3:
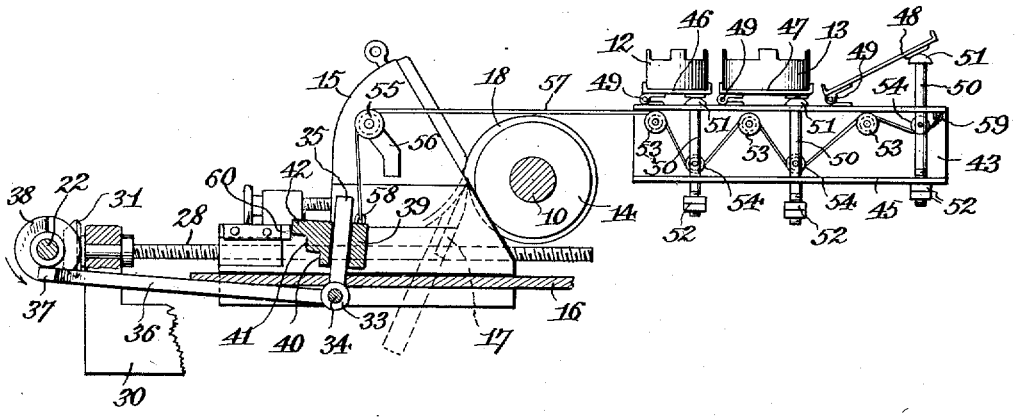
Figure 3 is a section illustrating a relation of parts just prior to the stopping of the knife carriage in its travel toward the work holding chucks.
Figure 4:
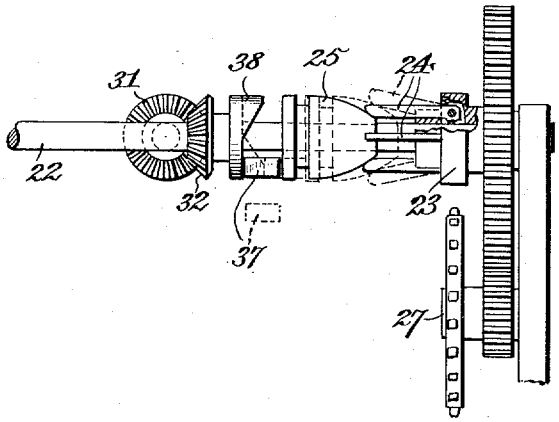
Figure 4 is a front view showing parts of the knife carriage operating mechanism.

The present invention is shown applied to a rotary veneer lathe, by way of example, and it is to be understood that the invention is also applicable to other lathes employing a material removing tool or cutter mounted on a carriage which travels toward and away from the work, for the purpose of stopping the carriage at the desired position to prevent serious damage or injury to the tool or cutter.

In the drawings only one end of the rotary veneer lathe is shown. This lathe includes a spindle 10 at each end supported for rotation in suitable bearings carried by heads 11. Logs of various sizes as to length and diameter are used to produce the veneer, and this requires the use of chucks of different diameters, such for instance as a 6-inch chuck, a 7-inch chuck and an 8-inch chuck which are illustrated in the present instance and are indicated 12, 13 and 14, respectively. The chucks are used in conjunction with the spindles of the lathe for the purpose of chucking logs at the ends and turning them. The lathe also includes a carriage 15 which is guided for movement by a guide 16 at each end of the carriage, said guide being carried by one of the heads 11 at the related end of the lathe. The carriage 15 is thus mounted for movement toward and away from the spindles 10 and their chucks. The carriage has attached thereto a knife 17 against which the log 18 turns as the carriage travels toward the log to produce the veneer. Each spindle 10 is rotated from a drive shaft 19 by the intervention of gears 20 and 21. The carriage 15 is operated by suitable means operatively connected with one spindle 10 and the carriage 15. The said means includes a driven shaft 22, and a clutch 23 which operates in conjunction with the shaft 22, said clutch having spring actuated fingers 24 adapted to be engaged with the shaft to cause it to rotate and to be disengaged from the shaft to stop it from rotating. A clutch throw-out collar 25 is positioned on the shaft 22 to slide thereon, and a throw-out lever 26 co-operates with the collar 25 to move the latter for the purpose of disengaging the fingers 24. The clutch 23 is driven by suitable driving connections 27 between the spindle 10 and the clutch 23. A lead screw 28 operates in conjunction with a nut 29 on each end of the carriage 15. The screw 28 is supported for rotation and is held against axial movement by a bracket bearing 30 fixed to the related head 11. The screw 28 has a bevel gear 31 which meshes with a similar gear 32, keyed to the shaft 22. It will now be understood that when the shaft 22 is rotating in one direction, the carriage 15 will be caused to travel toward the chucks, and when the shaft 22 is rotated in an opposite direction, the carriage 15 will be caused to travel away from the chucks.

In order to stop the carriage 15 at the required distance from the chucks during its travel toward the latter, and according to the size of the chucks in use, there is provided mechanism presently to be described. Use is made of a bell crank lever 33 having a horizontally disposed fulcrum or pivot 34 carried by one of the heads 11. The lever 33 presents an arm 35, and an arm 36, the latter being flexible, and provided with a cam engaged end 37. A cam collar 38 is secured to the shaft 22 and co-operates with the end 37 when the latter is brought into co-operative relation with respect thereto, to flex the arm 36, which will cause the end 37 to press against the collar 25 and move the latter into engagement with the clutch fingers 24 causing the latter to free the shaft 22 to stop rotation of the latter. The lever 26 may be operated in any suitable manner to slide the collar 25 out of engagement with the clutch fingers 24 and permit the latter to engage and transmit rotation to the shaft 22. An element 39 is arranged for sliding movement on the arm 35 of the lever 33. The element 39 has a plurality of relatively offset stop portions 40, 41 and 42 according to the number and sizes of the chucks used. Inasmuch as the chucks 12, 13 and 14 provided in the present instance are of three different sizes there are provided the three stop portions 40, 41 and 42. The stop portions 40, 41 and 42 correspond respectively to the chucks 12, 13 and 14, for a purpose to be explained hereinafter. Arranged on one of the heads 11 in fixed relation thereto is a structure consisting of a vertically disposed plate 43 and horizontally disposed plates 44 and 45 arranged in superposed spaced relation on the plate 43. A plurality of seats or platforms 46, 47 and 48 are mounted on the top of the plate 44 to swing on a horizontal axis, and this is accomplished by providing a hinged connection 49 between one edge of each seat or platform and the plate 44. A lift pin or rod 50 is provided for each seat or platform, and each is mounted for up and down axial movement in the plates 44 and 45. Each pin or rod 50 has a head 51 on the upper end thereof to limit the downward movement by the engagement of the head 51 with the plate 44, and has nuts 52 adjustable on the lower end which limit the upward movement of the same by engagement with the plate 45. Pulleys 53 are rotatably mounted on the plate 43, pulleys 54 are rotatably mounted respectively on the pins or rods 50, and a pulley 55 is rotatably mounted on an arm 56 carried by the head 11 adjacent the arm 35 of a lever 33. A flexible member 57 has one end thereof connected as at 58 with the element 39, is passed over the pulley 55, and is trained over the pulleys 53 and under the pulleys 54, and the remaining end thereof is connected as at 59 with the plate 44. Attention is now called to the fact that the chucks 12, 13 and 14 when not in use are kept respectively on the seats or platforms 46, 47 and 48. When the three chucks are in place respectively on their seats, the element 39 will be held in neutral position. It will be apparent that these chucks serve as weights which bear down on the seats, and the latter in turn bear down on the heads of the pins or rods 50 causing the pulleys 54 of the latter to pull down on the flexible member 57, thereby raising the element 39 to the neutral position.

When, for instance, the 8-inch chuck 14 is removed from the seat or platform 48 and is used for chucking the log 18, the related pin or rod 50 will move upwardly, allowing the element 39 to lower to a point in which the stop portion 42 will be in the path of travel of a fixed arm 60 on the carriage 15. As the carriage 15 travels toward the log, the arm 60 will encounter the stop portion 42 causing the element 39 to act on the arm 35 to move the lever 33 to a position in which the end 37 of the lever will be in co-operative relation to the cam collar 38. As the shaft 22 continues to rotate in a counter-clockwise direction, the cam collar 38 will act on the end 37 causing the arm 36 to flex and the end 37 to push on the throw-out collar 25. This will cause the collar 25 to act on the clutch fingers 24 thereby disengaging or throwing out the clutch 23 with the result that the shaft 22 will stop rotating, and the carriage 15 to stop in a predetermined position or a suitable distance away from the chucks used. It will therefore be apparent that the knife 17 will be prevented from coming in contact with the chucks and will not be injured or damaged, which might occur when the carriage 15 is allowed to travel far enough to encounter the chucks, in consequence of the log being reduced in diameter to the diameter of the chucks. This action takes place depending upon which chuck is removed from its related seat. It will therefore be apparent that the carriage 15 may be stopped in any one of several different positions according to the size of chuck used in conjunction with the log. It is to be understood that it is customary to use the same size chucks on both spindles of the lathe at the same time. It will also be apparent that the upward movement of any particular pin or rod 50 is regulated to allow the element 39 to drop so that the proper portion thereof will be in position to be encountered by the arm 60.

From the foregoing it will be apparent that the lathe may be operated to prevent injury or damage to the knife by stopping the knife carriage 15 without requiring any particular attention in this respect on the part of the operator; and that said carriage may be stopped in any one of several different positions according to the size of the chucks used.

What is claimed is:

1. The combination with a lathe including work holding rotary chucks, a knife carriage mounted for movement toward and away from said chucks, and means to operate said carriage; of means operated by said carriage to stop the operation of the first mentioned means to stop the movement of the carriage during its travel toward said chucks in a predetermined position, so as to prevent the knife thereof from coming in contact with said chucks, and means including various additional chucks which serve as various counterbalancing weights to regulate the second mentioned means so that it will operate the first mentioned means at different times to stop said carriage in any one of several positions according to the sizes of chucks used.

2. The combination with a lathe including work holding rotary chucks, a carriage mounted to travel toward and away from said chucks, a knife on said carriage, means including a drive shaft and a clutch to operate said carriage; of a cam fast on said shaft, a lever, a stop on said lever, an arm fixed on said carriage, said arm being engageable with said stop during the travel of said carriage toward said chucks to move the lever to a position to be engaged by said cam to throw out the clutch to stop the carriage in a predetermined position so as to prevent injury to the knife.

3. The combination with a lathe including work holding rotary chucks, a carriage mounted to travel toward and away from said chucks, a knife on said carriage, means including a drive shaft and a clutch to operate said carriage; of a cam fast on said shaft, a lever, an element arranged on said lever, said element having a plurality of relatively offset stops, an arm fixed on said carriage, and means connected with said element and adapted to hold the latter in various positions on the lever to bring either of said stops in the path of travel of said arm, to be engaged thereby to move the lever to a position to be engaged by said cam to throw out the clutch to stop the carriage in one of several positions according to the size of chucks used, so as to prevent injury to the knife.

4. A device for lathes including the combination of a movable knife carriage, driving means to move the carriage, a lever to control the operation of said driving means, an element arranged on said lever, said element having a plurality of stop portions disposed in relatively different planes, a fixed frame, pins slidable in the frame, pulleys on the frame, pulleys respectively on said pins, plates each mounted on said frame for movement on a horizontal axis, a removable weight adapted to be positioned on each plate, a flexible member connected at one end with said frame and entrained over said pulleys and connected at its opposite end with said element, and means on the carriage which co-operates with said stop portions to operate the lever to cause the latter to operate said driving means to stop the carriage in one of several different positions.

5. A device for lathes including the combination of a movable knife carriage, driving means to move the carriage, a lever to contol the operation of said driving means, an element arranged on said lever, said element having a plurality of stop portions disposed in relatively different planes, a fixed frame, pins slidable in the frame, pulleys on the frame, pulleys respectively on said pins, plates each mounted on said frame for movement on a horizontal axis, chucks of different sizes and weights, there being one for each plate to be positioned thereon and removed therefrom, a flexible member connected at one end with said frame and entrained over said pulleys and connected at its opposite end with said element, and means on the carriage which co-operates with said stop portions to operate the lever to cause the latter to operate said driving means to stop the carriage in one of several different positions.

6. In a safety stop mechanism, in combination, a plurality of platforms each mounted to swing on a horizontal axis, a plurality of various weights for said platforms, respectively, a stop member, and means connected with said stop member which is adapted to co-operate with said platforms and weights to retain said stop member in different adjusted positions.

7. In a safety stop mechanism, in combination, a plurality of platforms each mounted to swing on a horizontal axis, a plurality of various weights for said platforms respectively, a stop member, a flexible element connected at one end with said stop member and having its opposite end fixed, and means which coacts with said flexible element and platforms and weights to retain said stop member in different adjusted positions.

8. In a safety stop mechanism, in combination, a plurality of platforms each mounted to swing on a horizontal axis, a plurality of various weights for said platforms respectively, a stop member, a flexible element connected at one end with said stop member and having its opposite end fixed, and means which coacts with said flexible element and platforms and weights to retain said stop member in different adjusted positions, and said means including members movable up and down in contact with said platforms respectively.

9. In a safety stop mechanism, in combination, a stop element having a plurality of stop portions disposed in relatively different planes, and means to retain said stop element in one of several different positions to bring any one of said stop portions in the path of travel of an actuating member, said means including weight platforms movable into and out of substantially horizontal positions.

10. In a safety stop mechanism, in combination, a stop element having a plurality of stop portions disposed in relatively different planes, and means to retain said stop element in one of several different positions to bring any one of said stop portions in the path of travel of an actuating member, said means including platforms movable into and out of substantially horizontal positions, and elements of various sizes and weights for arrangement on said platforms respectively.

11. In a safety stop mechanism, the combination with a stop member, of a plurality of seats, each having a limited range of movement, yieldable means to move each seat to one limit of its range, a weight for each seat effective by gravity, when imposed upon the seat, to move the latter to its other limit in opposition to said yieldable means, and means controlling the position of said stop member in accordance with the positions of the several seats.

12. In a safety stop mechanism, the combination with a stop member, of a plurality of seats, weights normally resting on the respective seats, means for automatically moving any of the seats through a predetermined range when the weight is removed therefrom, and means actuated by the movement of any of the seats to effect a corresponding adjustment of the stop member.

13. In a safety stop mechanism, the combination with a stop member, of a plurality of seats having different ranges of movement, weights of different characteristics individually corresponding to the respective seats and normally resting thereon, means for automatically moving any of the seats through its range when the weight is removed therefrom, and means actuated by the movement of any of the seats to effect a corresponding adjustment of the stop member.

14. In a safety stop mechanism, the combination with a stop member normally in inoperative position, of a plurality of weights, supporting means for the respective weights, and means rendered effective by the removal of any weight from its support to adjust the stop member to a predetermined operative position.

15. In a safety stop mechanism, the combination with a stop member normally in inoperative position, of a plurality of weights, supporting means for the respective weights, each weight having its own particular place on the supporting means, and means rendered effective by the removal of any weight from its support to adjust the stop member to a predetermined operative position, said stop member having a different adjustment for each of said weights.

16. The combination with a lathe having rotary means to receive chucks of various sizes for holding the work, a knife carriage mounted for movement toward and away from said rotary means, and means to operate said carriage in conjunction with said rotary means; of a stop member adjustable to various positions in the path of the carriage, means connected with said stop member to stop the carriage, seats for receiving chucks not in use, each seat being adapted for one particular size of chuck, said seats having different ranges of movement, yieldable means to move each seat to one limit of its range, the weight of the chuck when imposed on the seat being effective to move the seat to the other limit of its range, and means controlled by the movement of each seat, when the chuck is removed therefrom for use on the lathe, to adjust said stop member to stop the carriage in accordance with the size of the chuck used.

17. The combination with a lathe having rotary means to receive chucks of various sizes for holding the work, a knife carriage mounted for movement toward and away from said rotary means, and means to operate said carriage in conjunction with said rotary means; of a plurality of seats for receiving the chucks not in use, each seat being adapted for one particular size of chuck, means for automatically moving any of the seats through a predetermined range when a chuck is removed therefrom for use on the lathe, a stop member, and means actuated by the movement of the seat to effect a corresponding movement of the stop member to stop the carriage at a point corresponding to the size of chuck used, to prevent the knife from coming into contact therewith.

18. The combination with a lathe having rotary means to receive chucks of various sizes for holding the work, a knife carriage mounted for movement toward and away from said rotary means, and means to operate said carriage in conjunction with said rotary means; of a plurality of seats for receiving the chucks not in use, each seat being adapted for one particular size of chuck, means for automatically moving any of the seats through a predetermined range when a chuck is removed therefrom for use on the lathe, the range of each seat varying in accordance with the size of chuck corresponding thereto, and means actuated by the movement of the seat to stop the carriage at a point corresponding to the size of chuck used, to prevent the knife from coming into contact therewith.

19. The combination with a lathe having rotary means to receive chucks of various sizes for holding the work, a knife carriage mounted for movement toward and away from said rotary means, and means to operate said carriage in conjunction with said rotary means; of a plurality of seats for receiving the chucks not in use, each seat being adapted for one particular size of chuck, a stop member normally in inoperative position, and means rendered effective by the removal of any chuck from its seat to adjust said stop member to a predetermined operative position to stop the carriage at a point to prevent the knife coming into contact with the chuck thus removed when the latter is used on the lathe.

20. The combination with a lathe having rotary means to receive chucks of various sizes for holding the work, a knife carriage mounted for movement toward and away from said rotary means, and means to operate said carriage in conjunction with said rotary means; of a plurality of seats for receiving the chucks not in use, each seat being adapted for one particular size of chuck, and means rendered effective by the removal of any chuck from its seat for use on the lathe, to stop the movement of the carriage at a point corresponding to the size of chuck used, to prevent the knife from coming into contact therewith.

In testimony whereof I have hereunto signed my name to this specification.

WILLIS J. ANTHONY.